Dec. 17, 1963 G. A. KERSTING 3,114,459

RECORD HOLDING FILE

Filed Aug. 14, 1961 2 Sheets-Sheet 1

INVENTOR.
George A. Kersting
BY [signature]
Attorneys

Dec. 17, 1963 G. A. KERSTING 3,114,459
RECORD HOLDING FILE
Filed Aug. 14, 1961 2 Sheets-Sheet 2
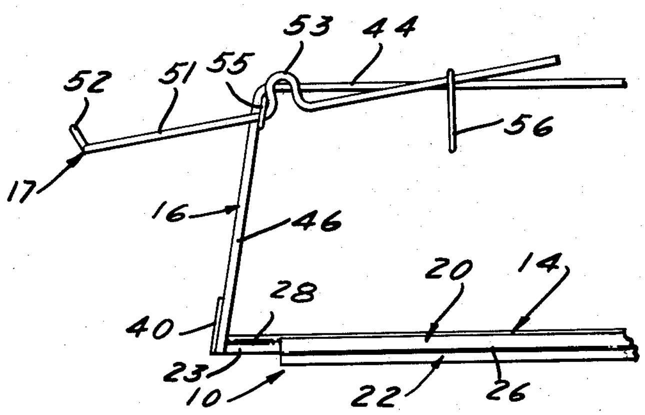
Fig. 3.
Fig. 4.
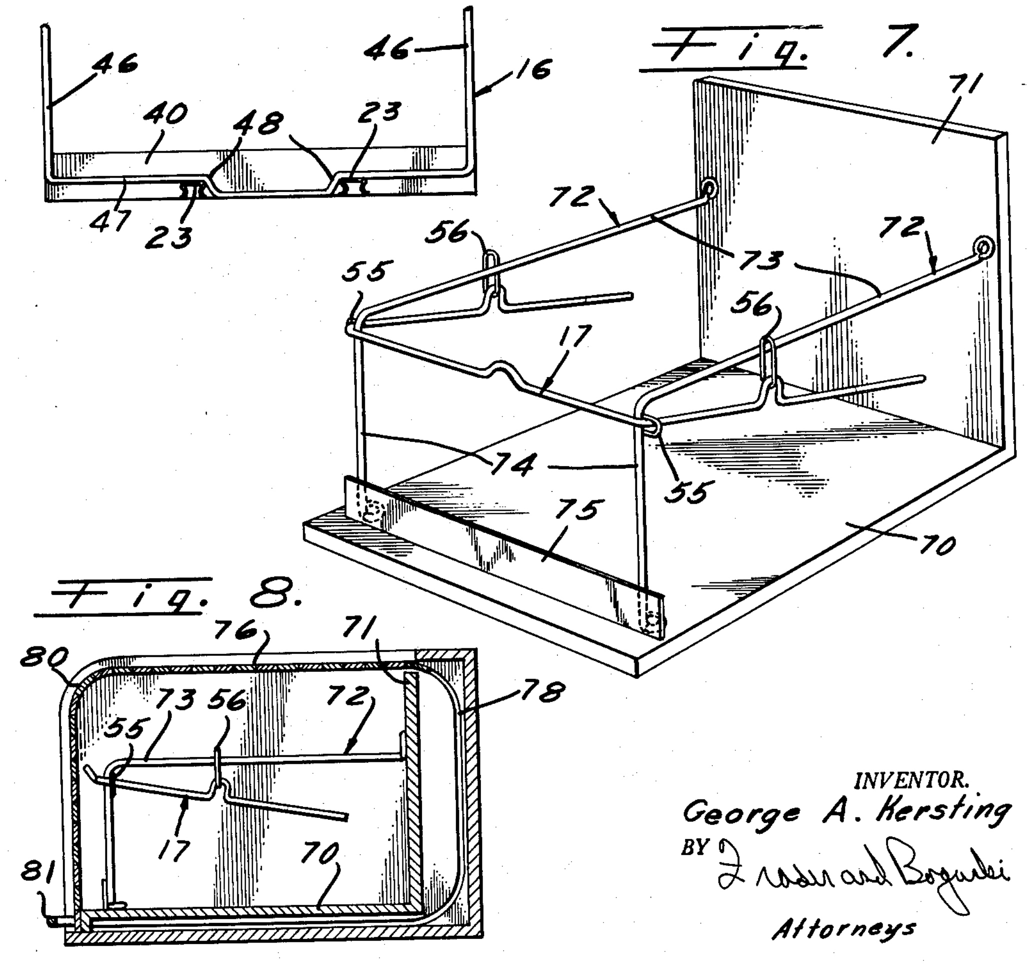
Fig. 4. Fig. 7. Fig. 8.
INVENTOR.
George A. Kersting
BY Frease and Bogucki
Attorneys United States Patent Office 3,114,459

Patented Dec. 17, 1963

3,114,459
RECORD HOLDING FILE

George A. Kersting, 29 E. Linda Vista, Alhambra, Calif.

Filed Aug. 14, 1961, Ser. No. 131,181
5 Claims. (Cl. 211—40)

This invention relates generally to devices for holding phonographic records, and more particularly relates to a file for receiving and storing phonographic records of various sizes including tapes and for permitting a front-view, flip-through selection of the records.

Phonographic record and tape reproducing equipment has enjoyed great popularity in the recent past. As is well-known users of such equipment tend to accumulate ever increasing collections which may include tapes as well as records of varying size. Thus such users may be faced with an acute storage problem for their records. The long-playing records which have to be reproduced at a speed of 33⅓ r.p.m. are frequently sold commerically with two or more selections on one record or on sets of two or more records. Thus the further problem arises to find a particular selection among a large number of records and this problem is aggravated when the selection desired is included in a record having another selection recorded thereon.

It is highly desirable to store records so that they are protected from dust and dirt which may damage the surface. Ideally the records are stored in cabinets which may also house part or all of the reproducing equipment. When such storage is selected it is important that the user have ready access to the collection of records so as to be able to view them and flip through the stack of records to select a desired record. During this operation the records must be housed and contained so that they do not fall or break and may be readily returned to their storage place.

In the past various types of racks and files have been devised to store collections of records. One such record file affords safe storage of the records and permits the file to be rolled out for viewing the records. However, even with this file the records are not securely held when they are tilted forward for ready inspection of their labels or jackets.

It is, accordingly, an object of the present invention to provide an improved phonographic record file which will safely hold records when stored away in a cabinet and which will permit the records to be tilted forward and still hold them securely when flipping through the record collection to make a selection.

Another object of the invention is to provide a record file which can be readily adapted to store records of varying sizes such as 33⅓ r.p.m. or 45 r.p.m. records or tapes and which can be manufactured inexpensively to satisfy a mass market.

A further object of the invention is to provide a file for receiving phonographic records which has a front portion that can be readily locked in a closed position as well as in an open position to securely hold the records while affording a front-view of the records and a flip-through selection thereof.

In accordance with the invention there is provided a phonographic record file which comprises a framework for receiving records and the like. The framework includes a bottom member for supporting the records. This bottom member may be fixed to a support or it may be slidably arranged by providing suitable fixed and stationary channels with ball bearings. The framework further has a rear member and side members to enclose and retain the records.

The front member of the file consists preferably of a rod of generally U-shape having a front portion to hold the records and legs adjacent the side members. Two guide means are provided to guide the front member and lock it in a closed and in an open position. To this end the legs of the front member are each formed with an upwardly extending hook-shaped loop which permits the front member to tilt forwards and downwards in its open position. Accordingly, selection of the records is greatly facilitated and at the same time the records are securely held within the framework of the file.

Other objects and features of the present invention will be apparent to those skilled in the art from the following detailed description taken in connection with the accompanying drawings, in which like reference characters refer to like parts throughout, and wherein:

FIG. 3 is a fragmentary side elevational view of the file of FIG. 2 illustrated in its open position;

FIG. 4 is a broken away, sectional view taken on line 4—4 of FIG. 2 and illustrating the mounting of the side and bottom members;

FIG. 7 is a view in perspective of a modification of the invention illustrating a fixed record file of simplified construction; and FIG. 8 is a side view of the record file of FIG. 7.

Figure 1:
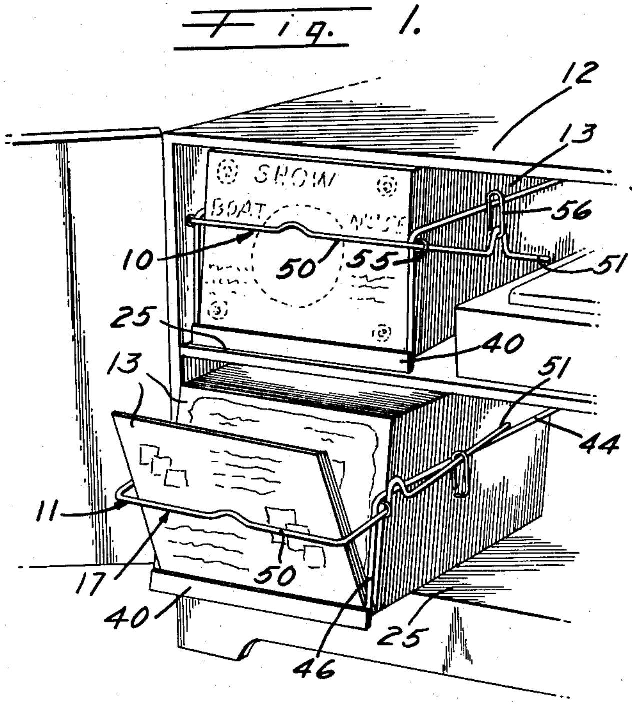
FIG. 1 is a view in perspective of a record cabinet having two files in accordance with the present invention, one file being shown pulled out and the other one in its closed or storage position.

Referring now to the drawings and particularly to FIG. 1 there are illustrated two record files 10 and 11 in accordance with the present invention. The two record files 10 and 11 are disposed one above the other in a cabinet 12 which may be a separate cabinet for receiving phonographic records only or may be used for housing the phonographic reproducing equipment also. The file 10 is shown in its closed position while the file 11 is rolled out of the cabinet 12 and shown in an open position with records 13 stored therein.

Figure 5:
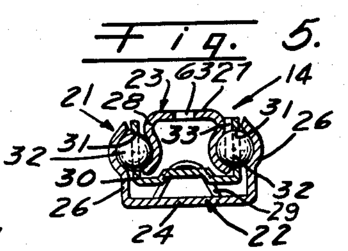
FIG. 5 is an enlarged, sectional view taken on line 5—5 of FIG. 2 and illustrating the construction of one of the sliding tracks.
Figure 2:
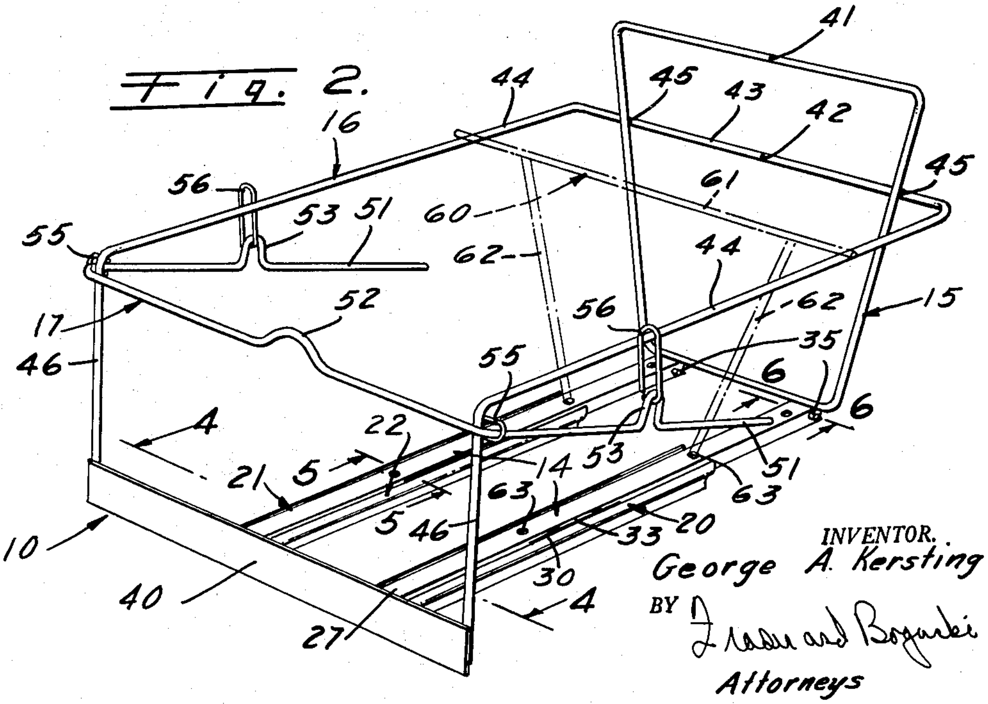
FIG. 2 is a perspective view of the file of the invention in its closed position.

As illustrated particularly in FIGS. 2 and 3 the record file such as 10 includes an open framework formed of a bottom member 14, a rear member 15, a side member 16 and a front member 17 which is movable with respect to the remainder of the framework. The bottom member 14 is adapted to be slidably mounted as will now be explained. The bottom member 14 consists of two slidable tracks 20 and 21, track 21 being shown particularly in FIG. 5 to which reference is now made.

The slidable track 21 includes a lower, stationary, U-shape channel 22 and an upper, movable, similarly U-shaped channel 23. Channel 22 has a lower horizontal portion 24 which may be secured, for example, by screws extending through suitable apertures therein into the bottom of the file supporting surface 25 in the cabinet 12. The lower channel 22 also has two side portions 26, each having a suitable concave bulge of the shape of a circular segment to receive a ball forming a bearing as will be more fully explained hereinafter. The upper channel 23 is of similar shape as the lower channel 22 and is disposed in the lower channel 22 in nesting relationship. Thus the upper channel 23 has an upper surface 27 which supports the records and two side portions 28, each having a concave bulge for receiving a ball.

The lower channel 22 is thus stationary with respect to the cabinet to which it is secured while the upper channel 23 is movable to permit rolling the record file 10 forward together with its collection of records. The bearing for the two U-shape channels 22, 23 is provided by a carriage 30 which is also of U-shape and nests, as clearly shown in FIG. 5, within the two channels 22 and 23. The carriage 30 has two suitable cut-outs 31 in its front and rear portions to receive two pairs of balls 32 which may consist of Teflon or other suitable material. Thus it will be understood that each carriage such as carriage 30 is provided with four balls 32. Preferably the carriage 30 is provided with a leaf spring 33 which bears on the channel 23 to create a certain amount of friction between the carriage 30 and the channel 23 so that the file will stop in any position to which it has been moved. Further, the carriage 30 may be limited in its travel by bumpers attached to or formed integrally with the channel 22. One such bumper 29 is visible in FIG. 5.

It will now be apparent that as the file is pulled out of its cabinet, it will roll by virtue of the balls 32 bearing against the side portions 26 and 28 of the two channels. The carriage will roll half the distance of the upper, movable channel 23 so that the carriage remains well within the length of the two channels regardless of the extent of movement of the file.

Figure 6:
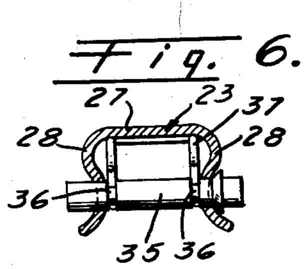
FIG. 6 is an enlarged, sectional view taken on line 6—6 of FIG. 2 and illustrating the construction of one of the stops for the sliding tracks.

Forward movement of the file is terminated by the stop illustrated particularly in FIG. 6. At the rear portion of the upper, movable channel 23 there is provided a stop rod 35 extending through suitable apertures in the side portions 28 of the channel. The rod 35 may have two intermediate portions 36 of reduced diameter and is locked in place by a wire 37 which extends within the channel 23 and surrounds the reduced rod portions 36.

It will be readily apparent that as the file slides forward the upper channel 23 moves forward until the stop rod 35 bears against the lower, stationary channel 22 to prevent further movement of the file. It will also be apparent that the tracks 20 and 21 may readily be assembled by inserting first the carriage 30 into the two nested channels 22 and 23 and thereafter inserting and locking the stop rod 35. Thus the rod 35 not only serves as a stop but also prevents the sliding tracks and bearing carriage from accidentally coming apart.

Rearward motion of the record file into the cabinet may be readily stopped by the stationary channel 22 engaging the bends 48 of a front portion 47 of the side member described below and attached to the front plate 40. Thus the file is positively confined in both its forward and rearward movement.

Referring again particularly to FIG. 2 the rear member 15 preferably consists of a steel rod which may have a diameter of ¼ inch and has the shape of a closed loop. The loop is closed by a butt weld 41 and the bottom portion of the loop 15 is spot welded to the upper surface of the upper, movable channel 23. The rear member 15 may have a rectangular shape or a trapezoidal outline, as illustrated. Preferably the upper portion of the back member 15 is above the middle of the records to be received to afford a secure backrest.

The side member 16 also preferably consists of a steel rod of ¼ inch diameter and is bent into the shape of a continuous loop closed by a butt weld 42 at its rear portion 43. The rear portion 43 extends into two horizontal side portions 44 which together form a U extending in a plane parallel to and above the bottom member 14. The rear portion 43 is spot welded as shown at 45 to the rear member 15. The side member 16 then continues to form two vertically downwardly extending portions 46 which are interconnected by a front portion 47. As shown particularly in FIG. 4 the lower front portion 47 has bends at 48 to pass over the upper channel member 23 and along the lower edge of the short front plate 40. As noted above, the channels 22 each engage the bends 48 in the closed position of the file. The front plate 40 is welded to the front portion 47 of the side member which is also welded to the upper channel 23.

The framework thus described forms an open receptacle for records, and its size can be made to accommodate either the larger long-playing records reproducible at 33⅓ r.p.m. or the smaller 45 r.p.m. records in which case the file can also accommodate audio tapes. Furthermore, although the construction of the framework is relatively simple and inexpensive it is very sturdy and affords a safe receptacle for phonographic records.

The front member 17 of the record file of the invention preferably also consists of a ¼ inch steel rod of generally U-shape. The front member includes a front portion 50 and two legs or side portions 51 disposed substantially adjacent the side portions 44 of the side member. The front portion 50 is preferably provided with an upwardly extending bend or open loop 52 which is rearwardly canted as clearly shown in FIG. 3. Thus the bend 52 affords a gripping means for pulling the front member 17 without interfering with the records stored in the file. Each of the legs 51 is provided with an upwardly extending open loop 53 for a purpose which will become evident hereinafter.

A first pair of guide rings or loops 55 is provided at the forward edge of each of the horizontal portions 44 of the side member 16 to retain and guide the front member 17. A second pair of guide rings or loops 56 is provided further rearwardly on the side portions 44.

Thus in the closed position of the file as shown in FIG. 2, for example, the loop 53 of the front member 17 rests in the guide loop 56. As a result, and since the loop 53 is relatively long, the legs 51 extend at a downward angle and the front member 17 is effectively locked in this position. The file can be pulled out of the cabinet by pulling on the bend 52 in the front portion 50 of the front member.

When it is desired to look at the records and to flip through them, the front portion 50 is lifted or rotated about the front guides 55 thereby to disengage the loop 53 from the second guide rings 56. Now the front member can be pulled forward until the loop 53 engages the front guide rings 55 and stops further movement of the front member. As clearly shown in FIG. 3 the front guide now tilts downward to facilitate tilting of the records so that the user can flip through them during a search for a particular record. At the same time it will be appreciated that the records are securely held from falling out of the front end of the file.

If desired a back rest 60 may be provided to subdivide the space available in the file or to accommodate it to a number of records smaller than its maximum capacity. The back rest includes a horizontal bar 61 which may rest on the side portions 44 of the side member 16 and two downwardly extending bars 62 which fit into apertures 63 provided at suitable intervals along the upper surface 27 of the channel 23.

A simplified modification of the phonographic record file of the invention is illustrated in FIGS. 7 and 8 to which reference is now made. This modification of the record file of the invention is not slidable and is therefore preferably provided with a roll top for protecting the records housed therein and for giving access to the records.

The embodiment of FIGS. 7 and 8 includes a solid bottom member 70, a solid rear member 71 and two side members 72 which may again consist of a steel rod having a horizontal portion 73 and a vertical portion 74. The horizontal portions 72 are secured to the back member 71 while the vertical portions 74 are secured to a front plate 75 which is also secured to the bottom member 70. A roll top 76 is slidable into the channel 78 in back of the back member 71 and below the bottom member 70. The roll top 76 is guided by a guide 80 and can be pulled over the file to protect the records or slid back into the channel 78 to expose the records. A handle 81 may be provided on the roll top 76.

The side member 72 is provided with two sets of guide rings 55 and 56 in the manner previously described to guide and lock the front member 17 which preferably has the shape previously explained in connection with FIGS. 1–6.

Thus while the file of FIGS. 7 and 8 is not movable, the records contained therein can be readily exposed to view by sliding the roll top 76 into its channel 78. By tilting and pulling forward the front member 17 as described hereinbefore, the records can be viewed from the top and flipped through to select a desired record from the collection housed in the file.

There has thus been described an improved file for phonographic records including tapes. This file may either be slidable or fixed and may be designed for records of different sizes. The file has a front member which may be locked either in a closed or in an open position affording in the latter position a front-view, flip-through manner of selecting records. Even during such selection the records are safely held in the file and are prevented from falling out of the front of the file by the movable front member.

Although particular arrangements have been shown in the drawings and described above for the practice of the present invention, it will be appreciated that such arrangements are given by way of example only and that the invention includes any and all alternative arrangements, modifications or variations falling within the scope of the annexed claims.

What is claimed is:

1. A phonographic record file comprising a generally open framework adapted to receive phonographic records and including a record supporting bottom member, a rear member secured to said bottom member, a rod-shaped side member having a first portion forming three sides of a rectangle spaced above said bottom member and secured to said rear member and having a front portion including vertically downwardly extending parts and a connecting part secured to said bottom member; and a movable rod-shaped front member of generally U-shape including a front portion and two generally smooth, longitudinally extending leg portions, an upwardly extending bend disposed intermediate each of said leg portions, first guide means disposed on the front end of said first portion of said side member for guiding the leg portions of said front member, and second guide means disposed on said first portion of said side member rearwardly of said first guide means to support said bends in said leg portions when said front member is in its closed position and to permit pulling said front member upwardly and forwardly to disengage said bend from said second guide means and to stop the forward movement when said first guide means interferes with said bends, each of said first and said second guide means comprising a rod-like loop secured to each side of said side member.

2. A record file as defined in claim 1 wherein said front portion of said front member is provided with an upwardly and rearwardly bent portion to facilitate gripping said front member without interfering with records in said file.

3. A phonographic record file comprising an open framework for receiving phonographic records and including a record supporting bottom member, a first rod having the shape of a closed loop and having a portion secured to said bottom member and forming the rear support of said framework, a second rod having the shape of a continuous loop and having a first front portion secured to said bottom member, a U-shaped portion extending above said bottom member and having a rear part secured to said first rod and having substantially vertical portions interconnecting said U-shaped portion to said first portion; and a movable third rod of generally U-shape and including a front portion and two free generally smooth, longitudinally extending legs, first guide means secured to said second rod in the vicinity of the junction of said U-shaped and vertical portions thereof for holding and guiding said third rod, second guide means disposed on said U-shaped portion of said second rod for guiding said free legs of said third rod, and stop means on said free legs cooperating with said guide means to stop said third rod in a closed position and in an open position to permit a front-view and flip-through selection of records in said file, each of said first and said second guide means comprising a rod-like loop secured to each side member, said stop means on each of said free legs comprising an upwardly extending bend disposed intermediate said leg and adapted to pass through said second guide means.

4. A slidably mountable phonographic record file comprising a generally open framework adapted to receive phonographic records and including a slidably mountable record supporting bottom member, said bottom member having a fixed U-shaped channel having a horizontal portion and two vertical side portions, said bottom member having a movable U-shaped channel having a horizontal record-supporting portion and two vertical side portions, said channels being disposed in nesting relationship, and roller bearing means including a carriage cooperating with said vertical side portions of said channels to permit sliding of said movable channel, said fixed channel being adapted to be secured to a fixed support; a rear member and side members secured to and supported by said movable channel; and a front member consisting of a rod of generally U-shape having a front portion and generally smooth, longitudinally extending legs, an upwardly extending hook-shaped loop in each of said legs, first guide means on each of said side members for retaining and guiding said front member, and second guide means on each of said side members spaced from said first guide means and adapted to support said loop on said legs when said front member is in a closed position, said loop interacting with said first guide means to stop forward and upward movement of said front member to permit easy access to records in said file, each of said first and said second guide means comprising a rod-like loop secured to each side of said side member, said hook-shaped loop being adapted to pass through only said second guide means.

5. A phonographic record file comprising an open framework for receiving phonographic records and including a record supporting bottom member, a rear member consisting of a rod forming a closed loop and having a portion secured to said bottom member, a side member consisting of a rod forming a continuous loop and having a U-shaped portion secured to said rear member and extending in a plane parallel to and above that of said bottom member, said side member having vertically downwardly extending portions defining a front plane and a connection portion secured to the front end of said bottom member; and a front member consisting of a rod of generally U-shape having a front portion and two generally smooth, longitudinally extending leg portions, each of said leg portions having a bend in the form of an upwardly extending loop, a first pair of guide rings secured to the forward part of the U-shaped portion of said side member for guiding said front member, and a second pair of guide rings secured to the U-shaped portion of said side member rearwardly of said first pair of guide rings, said second pair of guide rings being secured to support and normally retain the bends in said leg portions when said front member is in its closed position and within said front plane, whereby said front member may be pulled upwardly and forwardly to disengage said bends from said second pair of guide rings until said bends and first guide rings serve as a stop, thereby to permit pulling records in said file forward to flip through the records.

(References on following page)

References Cited in the file of this patent

UNITED STATES PATENTS

| | | |
|---|---|---|
| 410,257 | Smith | Sept. 3, 1889 |
| 460,768 | Andrews | Oct. 6, 1891 |
| 745,693 | Tobey | Dec. 1, 1903 |
| 757,194 | Huening | Apr. 12, 1904 |
| 995,487 | Scholl | June 20, 1911 |
| 1,321,167 | Voight | Nov. 11, 1919 |
| 1,998,850 | Shaffer | Apr. 23, 1935 |
| 2,190,178 | Wolters | Feb. 13, 1940 |
| 2,624,094 | Smith | Jan. 6, 1953 |

FOREIGN PATENTS

| | | |
|---|---|---|
| 117,216 | Sweden | of 1946 |